United States Patent Office 3,318,926
Patented May 9, 1967

3,318,926
7α-METHYL-16α-HYDROXY-ESTRONES
Georg Anner and Jaroslav Kalvoda, Basel, and Peter Wieland, Oberwil, Basel-Land, Switzerland, assignors to Ciba Corporation, New York, N.Y., a corporation of Delaware
No Drawing. Filed Dec. 21, 1964, Ser. No. 420,164
Claims priority, application Switzerland, Dec. 24, 1963, 15,945/63; May 27, 1964, 6,914/64; Dec. 9, 1964, 15,896/64
2 Claims. (Cl. 260—397.4)

This invention relates to the manufacture of 7α-methyl-16α-hydroxy-estrone and its 3,16-diacetate of the formula

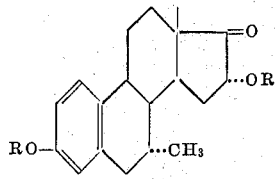

in which R represents hydrogen or an acetyl group. These compounds have valuable pharmacological properties. In the Allen-Doisy test (keratinization of the vagina), on subcutaneous administration to the castrated female rat, the exhibit a higher estrogenic action than the corresponding 7-desmethyl compounds, and they have at the same time a weak action on the growth of the uterus (Bülbring-Burn test). The new compounds are also characterized by a strong antigonadotropic action. These particular proportions of the specific actions of the new estrogenic substances make them especially suitable for the treatment of a wide variety of disorders of the menstrual cycle, such as dysmenorrheas and polymenorrheas, and climacteric deficiencies.

The compounds of this invention can be prepared in a manner known per se.

A preferred method consists in converting 7α-methyl-estrone in per se conventional manner into a 17-enolacylate, e.g. the enolacetate, and treating the resulting 7α-methyl-estrone-17-enolacylate-3-acylate with a strongly acid peracid, such as metachloroperbenzoic acid to obtain the corresponding 3,16-diacylate of 16α-hydroxy-7α-methyl-estrone, or with a less acid peracid, such as perbenzoic acid or perphthalic acid, and isomerizing the resulting 16,17α-oxido-7α-methyl-$\Delta^{1,3(10)}$-3,17 - diacyloxy-estratriene in a manner known per se, e.g. with glacial acetic acid in the presence of a catalytic quantity of a strong acid, such as e.g. perchloric acid, to form the 3,16α-diacylate of 16α-hydroxy-7α-methyl-styrene, and hydrolyzing the latter, if desired, under mildly alkaline conditions to obtain the 16α-hydroxy-7α-methyl-estrone, and acetylating the latter, if desired, in per se conventional manner.

7α-methyl-estrone can be prepared as described in application Ser. No. 420,146, filed on even date herewith.

The new compounds can be used in the form of pharmaceutical preparations containing them in admixture or conjunction with an organic or inorganic, solid or liquid excipient suitable for enteral, e.g. oral, parenteral or topical administration. Suitable excipents are substances that do not react with the new compounds, for example water, gelatine, lactose, starches, magnesium stearate, talcum, vegetable oils, benzyl alcohols, gums, propylene glycols, cholesterol or other known medicinal excipients. The pharmaceutical preparations may be, for example, tablets, dragées or capsules, or in liquid form solutions, suspensions or emulsions. They may be sterilized and/or may contain assistants such as preserving, stabilizing, wetting or emulsifying agents, solution promoters, salts for regulating the osmotic pressure or buffers. They may also contain further therapeutically valuable substances. The content of the active ingredient in these preparations is preferably within the dose range of 0.002 and 1 mg. per unit dose.

The following examples illustrate the invention:

EXAMPLE 1

A solution of 1.0 g. of 7α-methyl-estrone in 10 ml. of isopropenyl acetate, after being treated with 0.625 ml. of a catalyst solution prepared by mixing 0.4 ml. of concentrated sulfuric acid with 20 ml. of isopropenyl acetate, is heated to the boil. In the course of one hour, 2.5 ml. of the solvent are distilled off, another 10 ml. of isopropenyl acetate and 0.625 ml. of catalyst solution are added, and 9 ml. of solvent distilled off in the course of 2 hours. The reaction mixture is cooled to 5° C., treated with a solution of 1.5 ml. of pyridine in 10 ml. of ether, diluted with a 5:1 mixture of ether and methylene chloride, washed neutral with ice-cold sodium bicarbonate solution and with water, the washings extracted with ether, and the organic solutions dried and evaporated under a water-jet vacuum. The crude product obtained (1.5 g.) is purified by chromatography on silica gel. The pure $\Delta^{1,3,5(10),16}$-3,17-diacetoxy-7α-methyl-estratetraene is eluted with benzene.

940 mg. of the resulting crystalline $\Delta^{1,3,5(10),16}$-3,17-diacetoxy-7α-methyl-estratetraene is dissolved in 21 ml. of chloroform, 9 ml. of 0.48-molar monoperphthalic acid in ether are added, and the batch allowed to stand for 18 hours at 20° C. 50 ml. of water are added and the reaction mixture then diluted with ether, the aqueous phase is separated, extracted with ether, the organic solutions washed neutral with a 5% potassium iodide-15% sodium thiosulfate solution and an ice-cold sodium bicarbonate solution, and then with water, dried and evaporated under a wet-jet vacuum. There are obtained 1.02 g. of crude $\Delta^{1,3,5(10)}$-3,17-diacetoxy-7α-methyl-16,17-oxido-estratriene which on being recrystallized twice from methylene chlorode+petroleum ether yields 422 mg. of the pure compound melting at 145–147° C.

260 mg. of the last-mentioned compound are treated with 2.6 ml. of a mixture of 0.2 ml. of 70% perchloric acid and 9.8 ml. of 96% acetic acid, and stirred for one hour at 20° C. The slightly greenish-colored reaction solution is diluted with water, extracted with ether, washed twice with ice-cold sodium bicarbonate solution and twice with water, dried, and the ether evaporated under reduced pressure. The resulting crude product (254 mg.) consists of a mixture of $\Delta^{1,3,5,(10)}$-3,16-diacetoxy and 3,16-dihydroxy-7α-methyl-17-oxo-estratriene which is either acetylated in pyridine+acetic anhydride, to convert the free 3,16-dihydroxy-compound into the 3,16-diacetate or separated by chromatography on 40 times its quantity of silica gel. The aforementioned diacetate is eluted with benzene. After being recrystallized from methylene chloride+ether+petroleum ether it melts at 138–139° C. $[\alpha]_D^{20}=+126°\pm2$.

The starting material is prepared, for example, as follows:

To a solution of 250 mg. of lithium in a mixture of 4.6 g. of diphenyl and 25 ml. of tetrahydrofuran are added 0.55 ml. of diphenylmethane and 1 g. of 3-oxo-7α- methyl - 17 - ethylenedioxy-$\Delta^{1,4}$-androstadiene which are rinsed in with 5 ml. of tetrahydrofuran. The mixture is boiled and stirred for 2 hours under a current of nitrogen, then cooled with a mixture of ice and methanol, and treated with 2.5 g. of ammonium chloride. The solution discolors. 10 minutes later, it is treated with 7.5 ml. of water and with benzene. It is then washed with a dilute solution of sodium chloride, extracted with benzene, dried, and evaporated under vacuum. The residue is treated with 30 ml. of 90% acetic acid and the flask filled with nitrogen and heated from 60° to 80° C. in the course of 25 minutes. The batch is then evaporated under reduced pressure, and this operation repeated once with benzene. The residue is chromatographed over 30 g. of alumina (activity II). The $7\alpha$-methyl estrone is eluted with benzene. Recrystallization from a mixture of methylene chloride and ether results in 350 mg. of the product. It melts at 233–236° C. and its mixed melting point with authenic material shows no lowering, and the IR sprectrum is identical with that of authentic material.

EXAMPLE 2

1 g. of $7\alpha$-methyl-estrone is dissolved in 10 ml. of acetic anhydride containing 150 mg. of para-toluenesulfonic acid. The mixture is heated at 100° C. for 2 hours and the solution, after cooling, poured into ice-water. On extraction with ether and washing the extract neutral with ice-cold sodium bicarbonate solution, and water, drying and evaporating it, 1.4 g. of crude $\Delta^{1,3,5,(10),16}$-3,17-diacetoxy-$7\alpha$-methyl-estratetraene are obtained.

This product is dissolved in 50 ml. of methylene chloride, the solution treated with 650 mg. of metachloroperbenzoic acid, and allowed to stand at 20° C. for 3 hours. On working up in the usual manner, 1.4 g. of the corresponding 16,17$\alpha$-epoxide are obtained. This compound is dissolved in 20 ml. of glacial acetic acid containing 0.5 ml. of 70% perchloric acid, the solution left to itself at room temperature for an hour and a half, then diluted with water, and extracted with ether. The organic layer is washed with ice-cold sodium bicarbonate solution and water, dried and evaporated under a water-jet vacuum. There are obtained 1.3 g. of crude $\Delta^{1,3,5,(10)}$-3 - 16$\alpha$-diacetoxy-$7\alpha$-methyl - 17 - oxo-estratriene; IR bands, inter alia, at 5.72, 5.76, 6.25, 8.10, 8.25 and 9.76 m$\mu$.

The $7\alpha$-methyl-estrone serving as starting material is prepared as follows:

0.2 ml. of a solution of 0.25 ml. of concentrated sulfuric acid in 5 ml. of dioxane is added to a solution of 500 mg. of $\Delta^4$-3-oxo-$7\alpha$-methyl - 17$\beta$-acetoxy - 19 - norandrostene in 4 ml. of absolute dioxane, 0.8 ml. of orthoformic acid ethyl ester and 0.04 ml. of absolute ethanol, and the whole is stirred for 20 minutes at 20° C. 0.5 ml. of pyridine is then added and the solution is evaporated under a water-jet and a high vacuum; the residue is mixed with water and ether, and the organic layer is once more washed with water, dried and evaporated under a water-jet vacuum, to yield 590 mg. of a yellow oil which, on chromatography on neutral alumina (activity II), yields 303 mg. of crystalline $\Delta^{3,5}$ - 3 - ethoxy - $7\alpha$ - methyl - 17$\beta$-acetoxy-19-norandrostadiene. The infrared spectrum of this compound contains, inter alia, bands at 5.80, 6.00, 6.15, 8.03, 8.10, 9.60 and 9.75$\mu$. It is dissolved without previous purification in 10 ml. of acetone, mixed with a solution of 180 mg. of sodium acetate in 1.3 ml. of water, cooled to about $-15°$ C., 255 mg. of N-bromo-succinimide and 0.2 ml. of glacial acetic acid are added, and the batch is stirred for 2 hours at $-15°$ C. to $-20°$ C. A solution of 300 mg of potassium iodide in 1.5 ml. of water and then 400 mg. of sodium thiosulfate in 2 ml. of water are added, the mixture is diluted with ether, the organic layer is washed with water, dried and evaporated under a water-jet vacuum. The resulting crude $\Delta^4$-3-oxo-6-bromo-17$\beta$-acetoxy-19-norandostene is dissolved in 5 ml. of acetone, mixed with 2 drops of concentrated hydrochloric acid and refluxed for 2 hours. Conventional working up yields amorphous $7\alpha$-methylestradiol-17-acetate whose infrared spectrum contains bands, inter alia, at 2.82, 5.80, 6.20 (6.32), 6.68, 8.07, 9.60 and 9.75$\mu$.

1.7 g. of the compound so obtained are dissolved in a mixture of 4 ml. of dihydropyran and 4 ml. of tetrahydrofuran. 0.1 ml. of phosphorus oxychloride is added to the solution, which is then left to itself for 15 minutes with exclusion of moisture. The reaction solution is then poured on to 100 ml. of ice+water and 35 ml. of saturated sodium bicarbonate solution, and the mixture is extracted with ether. The organic layer is washed neutral with water, dried, and evaporated under a water-jet vacuum. The resulting colorless oil (2.10 g.) is then dissolved in methylene chloride and filtered through 30 times its weight of alumina (activity I). In the IR spectrum, the resulting $\Delta^{1,3,5(10)}$-3-tetrahydropyranyloxy-$7\alpha$-methyl - 17$\beta$-acetoxy-estratriene (1.76 g.) exhibits bands at 5.78, 6.23, 6.71, 8.20, 9.00, 9.74, 9.85 and 10.40$\mu$. It is hydrolyzed without being first purified. To this end, it is dissolved in 100 ml. of methanol, and a solution of 2.94 g. of potassium carbonate in 10 ml. of water added, the mixture then stirred, and boiled for 15 hours under reflux. The reaction mixture is then cooled, poured into 350 ml. of water while stirring vigorously, the crystalline crude product is filtered off with suction, washed with water, dissolved in ether, and the solution shaken once with water, dried, admixed with 3–5 drops of pyridine, and evaporated under a water-jet vacuum. The resulting crude, crystalline $\Delta^{1,3,5(10)}$-3-tetrahydropyranyloxy - $7\alpha$ - methyl - 17$\beta$-hydroxy - estratriene (1.52 g.) is dissolved in 15 ml. of acetone, the solution cooled to 0° C., treated, while being stirred and cooled, with 1.3 ml. of an 8 N-chromic acid solution in dilute sulfuric acid and, after about 1 minute, with 3 g. of sodium acetate. The reaction mixture is then diluted with water and ether, the aqueous layer separated, and extracted with ether. The organic solution is washed neutral with ice-cold sodium bicarbonate solution and water, dried, and evaporated under a water-jet vacuum. The resulting crude product yields on recrystallization from methylene chloride+ether and chromatography of the mother liquor a total of 1.10 g. of pure $7\alpha$-methylestrone-3-tetrahydro-pyranyl ether of melting point 157–159° C. (IR spectrum: bands, inter alia, at 5.78, 6.24, 6.72, 8.36, 8.93, 9.35, 9.66 and 10.34$\mu$).

A suspension of 385 mg. of the resulting compound in 12 ml. of 70% acetic acid is heated at 60° C. while being stirred for 15 minutes. The substance dissolves, and after a short while the product formed begins to settle out. The mixture is poured onto ice and extracted with ether+methylene chloride (4:1). The organic layer is washed with ice-cold sodium bicarbonate solution and with saturated sodium chloride solution. After being dried and evaporated in a water-jet vacuum, it yields 293 mg. of $7\alpha$-methyl-estrone which on being recrystallized from methylene chloride+methanol melts at 230–231° C.; $[\alpha]_D^{20}=+147°$ (c.=1.0).

EXAMPLE 3

80 mg. of $\Delta^{1,3,5(10)}$-3,16-diacetoxy - $7\alpha$-methyl-17-oxo-estratriene are suspended in 4 ml. of methanol, treated with 1 ml. of a 10% aqueous potassium bicarbonate solution, and refluxed for 7 minutes. The clear solution is then concentrated under a water-jet vacuum, and the product obtained on addition of water, is filtered off and washed with water. It is dissolved in a 1:1 mixture of methylene chloride and ether, the solution dried, and concentrated after the addition of petroleum ether. When the solution has cooled, 50 mg. of $\Delta^{1,3,5(10)}$-3,16$\alpha$-dihydroxy - $7\alpha$-methyl - 17 - oxo - estratriene crystallize which, after being recrystallized once from the same mixture of solvents, melt at 196–198° C., $[\alpha]_D^{20}=+157°\pm3$.

EXAMPLE 4

*Pharmaceutical preparations containing 16α-hydroxy-7α-methyl-estrone or its 3,16-diacetate*

(a) A tablet containing 0.003 mg. 16α-hydroxy-7α-methyl-estrone to be used as estrogenic preparation Ingredients:                                                Mg.
- 16α-hydroxy-7α-methyl-estrone _____ 0.003
- Lactose _____ 60.000
- Wheat starch _____ 20.000
- Colloidal silicic acid with hydrolysed starch _____ 5.000
- Talc _____ 5.000
- Magnesium stearate _____ 0.500
- Arrowroot _____ 9.497
                                                         ———
                                                         100.000

(b) A tablet containing 0.015 mg. of the 16α-hydroxy-7α-methyl-estrone 3,16-diacetate Ingredients:                                                Mg.
- 16α-hydroxy-7α-methyl-estrone-3,16-diacetate _____ 0.015
- Lactose _____ 50.000
- Wheat starch _____ 30.000
- Gelatine _____ 1.000
- Talc _____ 5.000
- Magnesium stearate _____ 0.500
- Arrowroot _____ 13.485
                                                         ———
                                                         100.000

*Preparation.*—The mixture of the active ingredients, lactose and wheat starch is moistened with a solution containing the colloidal silicic acid or the gelatine to form a slightly plastic mass and then granulated in the usual manner. After being dried at 40° the mass is brought into the usual grain size by being passed through a sieve. Arrowroot, magnesium stearate and talc are added to the dried mass and the mixture is then compressed into tablets of 7 mm. diameter.

(c) 1000 linguettes each containing 0.003 mg. of 16α-hydroxy-7α-methyl-estrone-3,16-diacetate Ingredients:                                                G.
- 16α-hydroxy-7α-methyl-estrone-3,16-diacetate _____ 0.003
- Lactose _____ 100.000
- Saccharose _____ 229.997
- Stearic acid _____ 3.000
- Talc _____ 17.000
                                                         ———
                                                         350.000

*Procedure.*—The mixture of the active substance with lactose is moistened with an aqueous solution of saccharose and granulated in the usual manner. After being dried, the sieved granulate is mixed with stearic acid and talc and then compressed into linguettes.

(d) 100 oil ampoules each containing 0.005 mg. of 16α-hydroxy-7α-methyl-estrone-3,16-diacetate Ingredients:
- 16α-hydroxy-7α-methyl-estrone-3,16-diacetate _____ g__ 0.0005
- Benzyl alcohol _____ ml__ 10.00
- Sesame oil _____ ml__ ad. 100

*Procedure.*—The active ingredient is dissolved in benzyl alcohol and the stirred solution diluted with hot sterilized sesame oil. 1 ml. of this solution containing the ingredients in the above amounts is filled in ampoules which are sterilized at 160° for 1.5 hours.

What is claimed is:
1. The 7α-methyl-16α-hydroxy-estrone of the formula

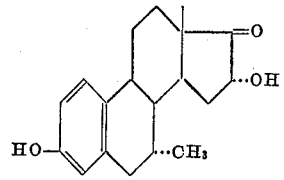

2. The 3,16-diacetate of the compound of claim 1.

References Cited by the Examiner

Fieser et al.: Steroids, pp. 692–96 (1959), Reinhold Publ. Co., New York.

Leeds et al.: J.A.C.S., vol. 76, pp. 2943–48, June 5, 1954 (page 2946 relied on).

LEWIS GOTTS, *Primary Examiner.*

H. A. FRENCH, *Assistant Examiner.*